United States Patent
Aihara

[15] 3,661,432
[45] May 9, 1972

[54] HYDROSTATIC BEARING ASSEMBLY

[72] Inventor: Kenzo Aihara, Tokyo, Japan

[73] Assignee: Ikegai Tekko Kabushiki Kaisha (Ikegai Iron Works, Ltd.), Tokyo, Japan

[22] Filed: Feb. 22, 1971

[21] Appl. No.: 117,459

[30] Foreign Application Priority Data

Feb. 26, 1970 Japan.................45/16573

[52] U.S. Cl..................................308/9
[51] Int. Cl. ...........................F16c 17/16
[58] Field of Search ..................308/9, 122, 121

[56] References Cited

UNITED STATES PATENTS 2,877,066   3/1959   Baumeister.....................308/122

*Primary Examiner*—Martin P. Schwadron
*Assistant Examiner*—Frank Susko
*Attorney*—Beveridge & De Grandi

[57] ABSTRACT

A hydrostatic bearing assembly in which an externally pressurized fluid is pumped to completely separate the bearing from the object which it supports; by utilizing the elastic deformation of a portion of the bearing itself, the flow rate of the pressurized fluid is controlled, and any increase in the pressure in that pocket which is subjected to the load serves to reduce the amount of the passage of this fluid from said pocket as a result of the elastic deformation of the bearing, and thus, the load supporting characteristics of the bearing is improved.

3 Claims, 8 Drawing Figures

PRIOR ART

INVENTOR
KENZO AIHARA
BY Beveridge & De Grandi

INVENTOR
KENZO AIHARA

BY Beveridge & De Grandi

HYDROSTATIC BEARING ASSEMBLY

BACKGROUND OF THE INVENTION

1. Field of the Invention

The present invention is concerned with an improvement of hydrostatic bearings, more particularly, an improvement of the load supporting characteristic of journal bearings, plain bearings and thrust bearings and thrust bearings which are used in machine tools.

2. Description of the Prior Art

Hydrostatic bearings include journal bearings, plain bearings and thrust bearings. These various types of bearings have been designed to function invariably based on the same technical principle, which may be summarized as follows.

The inner surface of the bearing in which an object, such as a shaft is supported in spaced relation by means of a pressurized fluid, is provided with a plurality of pockets or pads, each having a pressurized fluid supplying bore communicating with the external side of the bearing system. The object to be supported is loosely fitted inside the bearing in such a fashion that a narrow space or gap is left between the circumference of this object and several portions of the inner surface of the bearing, thus being located in those regions other than said pockets and bores. The bore formed through each of these pockets is operatively connected to one end of its mating orifice, while the other end of this orifice is operatively connected to a hydraulic (oil) pressure source. When the position of the axis of the supported object is shifted ($d$) owing to the variation of the amount of load applied onto said object, the thickness ($h$) of the pressurized oil film formed in the narrow space or path located on that side subjected to the applied load will decrease to ($h-d$), while the thickness of the oil film formed in the narrow space located on the opposite side will increase to ($h+d$). Such an arrangement is made as the pressured lubricating oil in the respective pockets is kept running through the narrow spaces which are located in the regions where the object to be supported is loosely fitted in the bearing, and the oil is forced to flow to the outside of the bearing system via discharge channels. The aforesaid change in the thickness of the oil film (in other words, a change in the amount of the narrow space or gap) will give rise to a change in the flow rate of the pressured oil passing through said narrow path. This latter change will sequentially cause a variation of the pressure of the oil located in the pocket. More specifically, the pocket pressure on the side of the loosely fitted region which is subjected to the applied load will rise, while the pocket pressure on the opposite side will drop. Thus metal-to-metal contact is prevented by the powerful supporting force which is created in the oil film on the side subjected to the applied load, thereby said supporting force being able to sufficiently cope with a shift in the position of the axis of the supported object which is caused by the varying load. This is the principle of the function of the conventional hydrostatic bearings. It should be understood, however, that any known hydrostatic bearing described above is, as a rule, formed with a rigid material. According to the present invention, however, the body of bearing is such construction that certain portions thereof may be deformed elastically when subjected to a certain pocket pressure so that the elastic deformation of said portion will positively cause a change in the amount of the narrow space or gap existing between the bearing and the supported object, thus improving the supporting ability of the bearing per se.

SUMMARY OF THE INVENTION

It is therefore, an object of the present invention to provide a hydrostatic bearing assembly having an improved load supporting capacity, by utilizing the elastic deformation of the bearing per se, which has been considered to be avoided from the point of view of the prior art.

Another object of the present invention is to provide a hydrostatic bearing assembly, which requires no precision machining or precision, such that the flow rate of the pressurized fluid, which is pumped into the assembly, is adjusted by utilizing said elastic deformation in the body of the bearing. The feature of the present invention, therefore, lies in the arrangement that, in a hydrostatic bearing in which the body of the bearing has pockets formed in the inner face thereof, each pocket being operatively connected via an orifice to a hydraulic (oil) pressure source, and that the pressured oil flowing from said pockets is allowed to pass through the narrow spaces defined between the inner surface of the bearing and the circumference of the supported object. In those regions of the body of bearing which are located in the vicinity of said narrow spaces there are provided portions elastically deformable by the pocket pressure so that this elastic deformation of the above portions is utilized in producing a change in the amount of said narrow space, thereby varying the passage resistance of said pressured oil flowing from the pocket and accordingly sharpening the operative relationship between this narrow space and the pocket pressure, and thus improving the load supporting characteristic of the hydrostatic bearings.

DETAILED DESCRIPTION OF THE PREFERRED EMBODIMENTS

Figure 1:
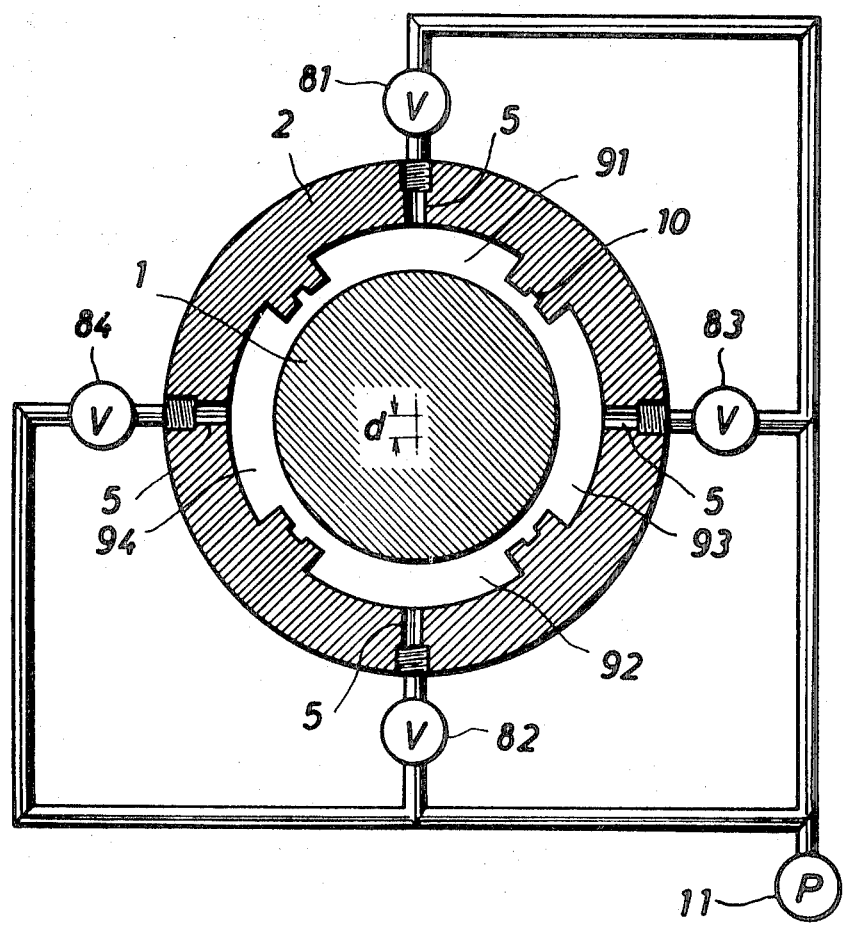
FIG. 1 is an illustration showing a section of a known hydrostatic bearing assembly taken in a direction perpendicular to the longitudinal axis thereof and also showing the pressurized lubricating oil pipe line which is associated with this assembly.

In order to compare the prior art with the present invention, a brief description of the structure of a known hydrostatic bearing assembly will be made hereunder by referring to FIG. 1. As seen in this drawing, the bearing 2 is provided, in the inner face thereof, with a plurality of pockets 91, 92, 93 and 94, each of which is in the form of a recess of said inner face. Each of these recessed pockets has a fluid supply bore 5 which opens at one end into the recess and communicates with the outside of the body 2 of bearing at the other end. A discharge groove 10 is provided in each pocket to lead the pressurized oil to the outside of the system. A shaft 1 or object to be supported is loosely fitted inside the bearing by leaving a narrow space or gap ($h$) between its circumference and those portions of the inner face of the bearing other than the pockets and the discharge grooves 10. The respective pockets are operatively connected to an oil pressure source 11 via the bores 5 and the orifices 81, 82, 83 and 84, respectively, in such a way as illustrated in the drawings. Whenever there occurs a change in the axial position of the shaft 1 by an amount ($d$) owing to the variation of the load applied onto the shaft 1, the amount of the gap on the side subjected to the applied load will decrease to ($h-d$), whereas the gap located on the opposite side will conversely increase to ($h+d$). As a result, the pocket pressure on the side which is subjected to the load will increase owing to the decreased amount of the pressurized oil which flows from the pocket. On the other hand, the pocket pressure on the opposite side will decrease. Thus, there is obtained a supporting force of the pressurized oil which is sufficient to support the applied load.

Figure 2:
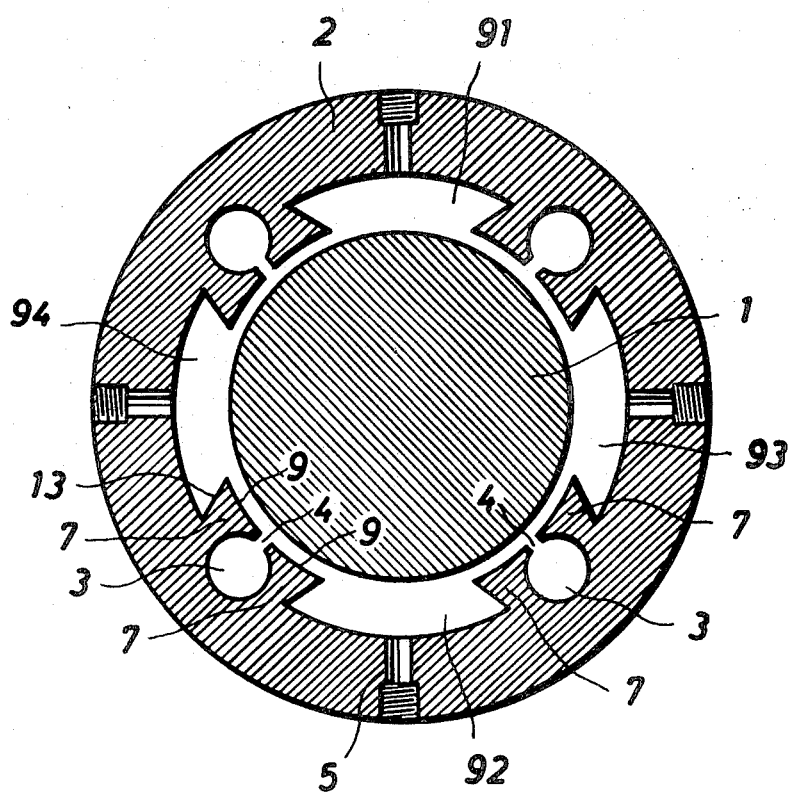
FIGS. 2 and 3 are sectional views of a bearing assembly taken in a direction perpendicular to the longitudinal axis thereof and representing the first embodiment of the invention.
Figure 3:
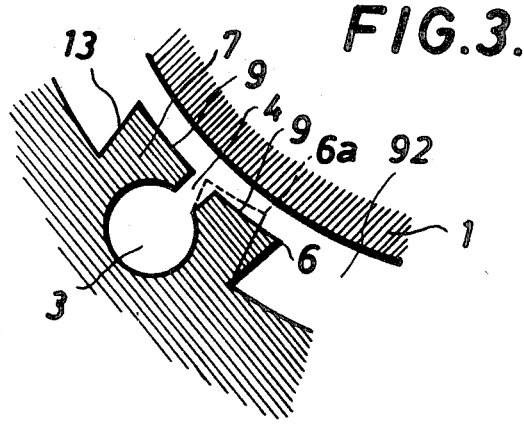

FIG. 2 shows the first embodiment of the present invention. The only matters different from the conventional arrangement of FIG. 1 are found within the fact that a discharge groove 4 corresponding to the groove 10 in FIG. 1 opens into a duct 3 which is formed longitudinally through the wall of the body of bearing 2 so as to communicate with the outside of the bearing, and that being adjoined to two pockets 91 and 93, 93 and 92, 92 and 94, 94 and 91, respectively, there is formed a pair of projections 7 and 7 in the form of wall members, each having an inclined side wall 13 of the pocket. These wall-like projections 7 are positioned so as to enclose the pockets therein, respectively, while supporting the shaft 1 at their respective supporting surfaces 9 via an oil film which is formed therebetween. The pressurized oil supplied to each pocket passes through the narrow space or gap formed between the circumference of the shaft 1 and the supporting surface 9 of the bearing 2 to flow through the discharge groove 4 into the duct 3 and be discharged to the outside of the bearing system. Each wall-like projection 7 and 7 aforesaid has a base portion where its size progressively decreases as it extends from the top toward the base and thereby provide a narrowed base owing to the cooperation of both the inclined inside wall 13 of the pocket and the duct 3, as seen in the drawing. Thus, each of the wall-like projections 7 and 7 are structured so as to be easily bent elastically at their narrowed base serving as the fulcrum for the bending. It should be understood that both this duct 3 and the discharge groove 4 are kept under the atmospheric pressure. As a natural consequence, the pocket pressure normally urges the wall-like projection 7 to elastically bend towards the discharge groove 4 side at its narrowed base which serves as the fulcrum for this bending. Whenever there arises a shift in the axial position of the shaft 1 owing to an increase in the load applied to the shaft 1, so that the pocket pressure is further increased, the projection 7 will be caused to incline to a further extent. As will be understood better by referring to FIG. 3 which shows a fragmentary enlarged view of the essential parts of the bearing, the edge portion 6 of the projection 7 moves to a position 6a which is indicated by a dashed line. As a consequence, the passage resistance of the running oil increases so that the pressure in the corresponding pocket is further increased, producing a force sufficient to resume the shaft 1 to its initial normal position. In other words, the wall-like projection 7 is caused to incline until the pocket pressure is brought into equilibrium with the load applied. As will be clearly understood from the foregoing description, the wall-like projection 7 is inclined in accordance with the change in the load applied, thereby the shifting in the axial position of the shaft 1 being prevented. Thus, the load supporting characteristic of the hydrostatic bearing (the relation between the amount of applied load and of attitude of the axis of the object to be supported) has been markedly improved.

Figure 4:
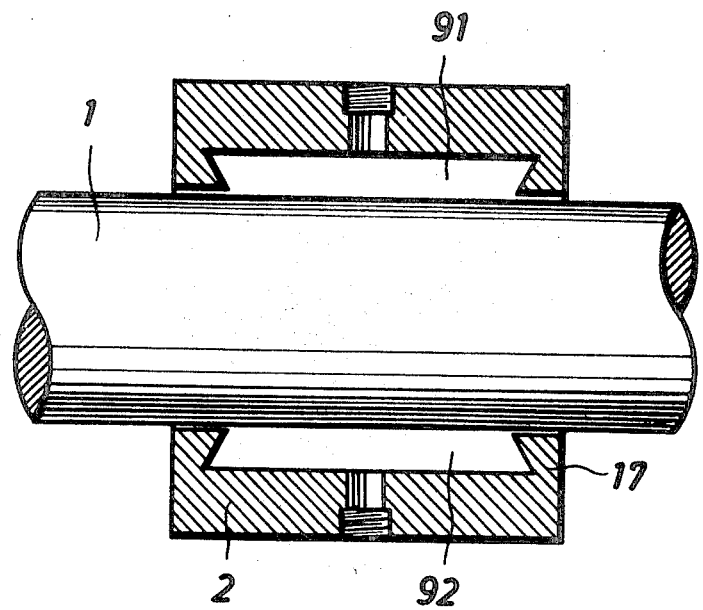
FIGS. 4 and 5 are sectional views of a hydrostatic bearing assembly shown in FIG. 2.
Figure 5:
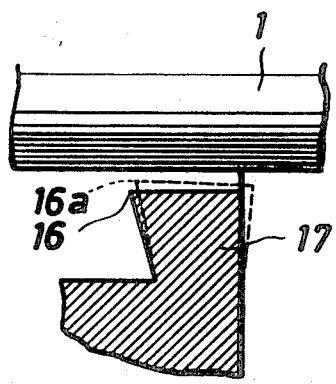

FIG. 4 is an axial sectional view of the bearing assembly shown in FIG. 2. The variation of the thickness of the oil film resulting from the elastic deformation of the bearing is the core of the present invention 1 which is seen in the region of the wall-like projection 17. When the pocket pressure rises, the edge 16 of the bearing shifts its position to position 6a which is indicated by a dashed line as shown in FIG. 5. As a result, the resistance of the pressurized oil passing in the narrow space or gap substantially increases, thereby increasing the pocket pressure to a further extent. Thus, the load supporting characteristic of the bearing is improved.

Figure 6:
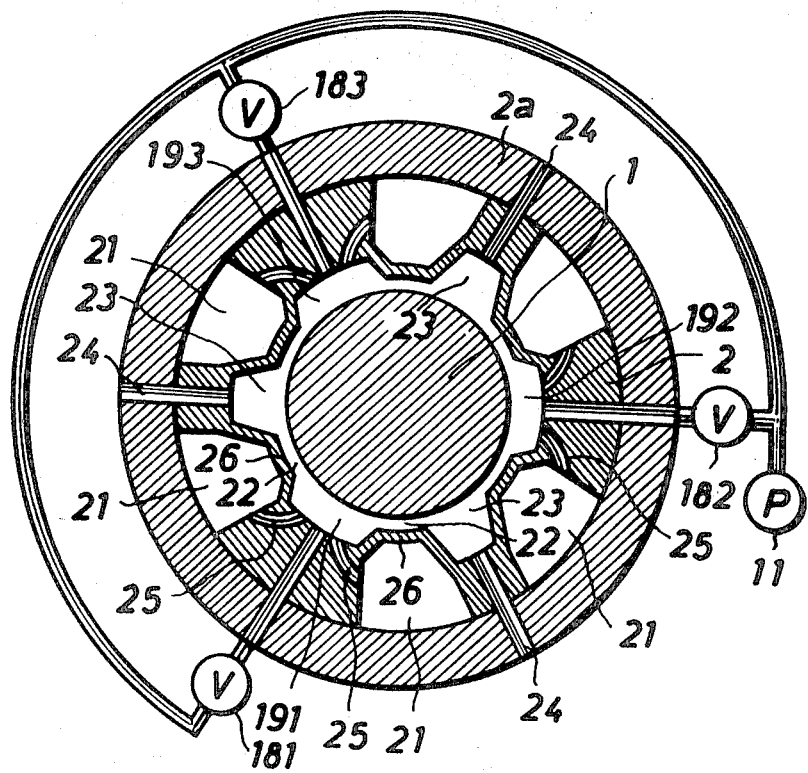
FIGS. 6 and 7 are sectional views of a hydrostatic bearing assembly taken in a direction perpendicular to the longitudinal axis thereof, and representing the second embodiment.
Figure 7:
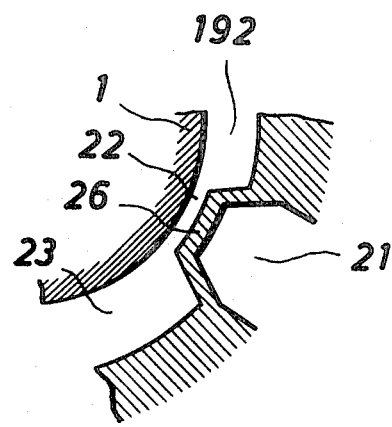

FIG. 6 is a sectional view of the hydrostatic bearing assembly of the second embodiment, perpendicular to the object to be supported. As seen in this drawing, the bearing is provided with pockets 191, 192 and 193 which are formed in the inner face thereof. These pockets are operatively connected to a hydraulic (oil) pressure source 11 via their corresponding orifices 181, 182 and 183, respectively. The bearing 2 is also provided, in its external circumference, with recessed portions 21. This external side of the bearing 2 is force-fitted in a sleeve 2a. Thus, the respective recessed portions 21 constitute pressure chambers.

Each of these pressure chambers 21 is positioned behind the loosely fitted region or narrow space 22 defined between the circumference of the shaft 1 and the bottom of the recessed portion 21, thus providing a narrow path for the pressurized oil flowing from the pocket. The pressure chamber 21 communicates with its adjacent pocket by means of a channel 25, thereby being filled with the pressurized oil.

This pressurized oil is forced to flow from said pocket, and therefrom it passes through the narrow space located at the loosely fitted region 22, flows into the discharge groove 23, and is expelled from the discharge duct 24.

When a rise occurs in the pocket pressure, it is accompanied by an increment of the pressure in the chamber 21. As a consequence, the difference in the pressure between the pocket and the discharge groove 23 augments the elastic deformation in a wall member 26 partitioning the pressure chamber 21 from the narrow space 22, resulting in a decrease in the amount of the narrow space or gap 22. As a consequence, the load supporting characteristic of this bearing is improved in the same way as described in connection with the preceding embodiment.

Figure 8:
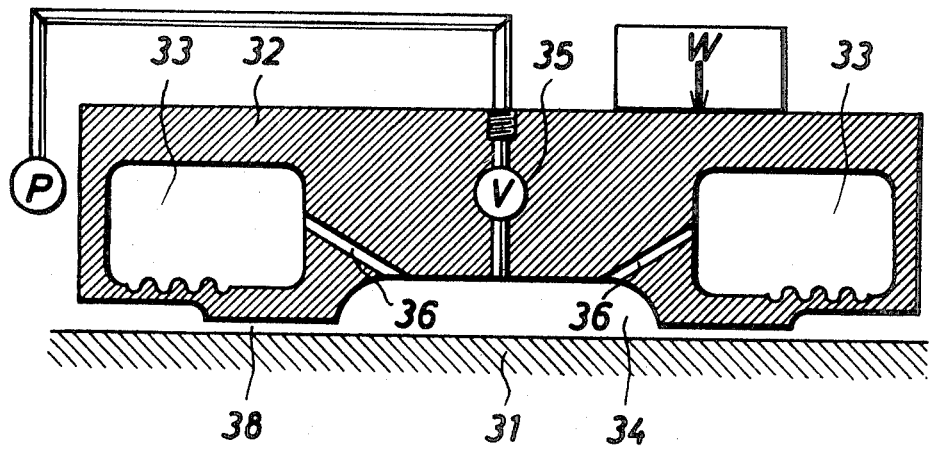
FIG. 8 is a sectional view of the pocket portion of a plain bearing representing the third embodiment.

FIG. 8 shows the third embodiment and a sectional view of a plain bearing intended for supporting the sliding face of a machine tool.

In this embodiment, a pocket 34 is formed in the sliding face of a movable member 32 of the bearing moving above and along a guide surface 31. This pocket 34 is operatively connected to an oil pressure source 37 via an orifice 35.

The pressurized oil contained in the pocket 34 passes through the narrow space or gap 38 which is formed between the movable member 32 of the bearing and the guide surface 31 to be discharged to the outside of the system.

Within the sliding member 32, there are defined pressure chambers 33 at positions located behind the respective gaps 38. Each of these pressure chambers 33 communicates with its adjacent pocket via a channel 36.

Whenever the pressure in the pocket 34 rises, the pressure in the pressure chamber 33 will increase to elastically deform that wall portion of the pressure chamber 33 located close to the guide surface 31, thereby narrowing the amount of the gap 38 to a further extent, accordingly.

As a result, the pressure in the pressure chamber 33 is further elevated. Thus the load supporting characteristic of the plain bearing is improved in the same fashion as that described in connection with the preceding two embodiments.

The present invention contemplates acceleration of the inherent elastic deformability of the bearing body and utilization of this forced elastic deformation to adequately meet the requirements of bearings. Therefore, according to the present invention, a powerful load bearing characteristic is materialized by the use of a simplified bearing structure, and at the same time, hydrostatic bearings are provided which enable their bearing gaps to be in a required optimum condition during the initial period of a change occurring in the load applied, by the adequate and timely adjustment of the supporting force imparted to this bearing. The hydrostatic bearing of the present invention has further advantages in that it can be manufactured easily since it requires no particular accessories or separate pieces of equipment or appliance, and therefore, there is hardly any fear of the occurrence of a disorder in the bearing assembly, and furthermore it has a superior time characteristic over the prior art in allowing the supported object to resume its normal position without delay.

The description of the present invention has been directed to the journal bearing and plain bearing. It should be understood, however, that the present invention may also be as effectively and equally applied to thrust bearing, based on the same technical conception.

What is claimed is:

1. A hydraulic bearing assembly having pockets formed in a bearing and connected to a hydraulic pressure source via corresponding orifices, and defining narrow spaces between said bearing and an object to be supported by said bearing through the passage of pressurized fluid supplied from said pressure source and flowing from said pockets, wherein in those regions of said bearing which are located in the vicinity of said narrow spaces are provided portions elastically deformable by the pocket pressure, so that the elastic deformations in said portions vary the amount of said narrowed spaces to alter passage resistance of pressurized fluid flowing from said pockets.

2. A hydraulic bearing assembly having pockets formed in a bearing and connected to a hydraulic pressure source via their corresponding orifices, and defining narrow spaces between said bearing and an object to be supported by said bearing through the passage of pressurized fluid supplied from said pressure source and flowing from said pockets, wherein said bearing has wall-like projections each being defined by a surface of the bearing facing said narrow space, an inner wall surface of each pocket and the side of each pocket exposed to the atmospheric pressure, said wall-like projections each having a narrowed base portion to enable said projection to elastically incline by the pocket pressured at its narrowed base serving as a fulcrum, to vary the amount of said narrow space and alter passage resistance of pressurized fluid flowing from each pocket.

3. A hydraulic bearing assembly having pockets formed in a bearing and connected to a hydraulic pressure source via corresponding orifices, and defining narrow spaces between said bearing and an object to be supported by this bearing through the passage of the pressurized fluid supplied from said source and flowing from said pockets, wherein pressure chambers communicating with adjacent pockets are provided within said bearing in the vicinity of said narrow spaces, respectively, so that each of said pressure chambers has an elastic wall facing said object to be supported, whereby an elastic deformation of said elastic wall caused by the pressure in each pocket communicating with each corresponding pressure chamber varies the amount of said narrow space to alter passage resistance of pressurized fluid.

* * * * *